S. D. REYNOLDS.
Horse-Collars.
No. 217,902. Patented July 29, 1879.
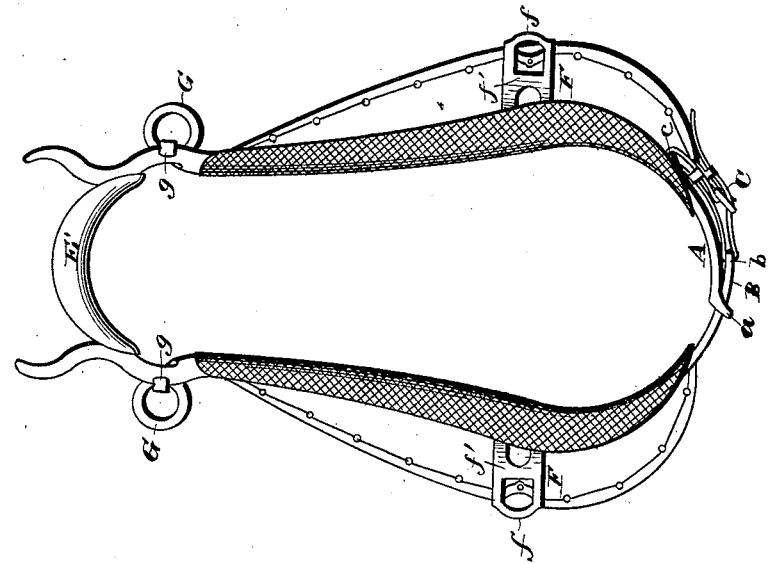
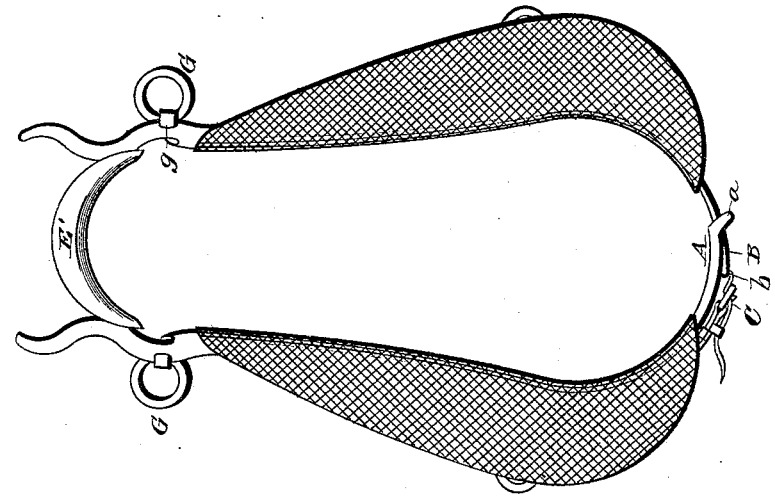

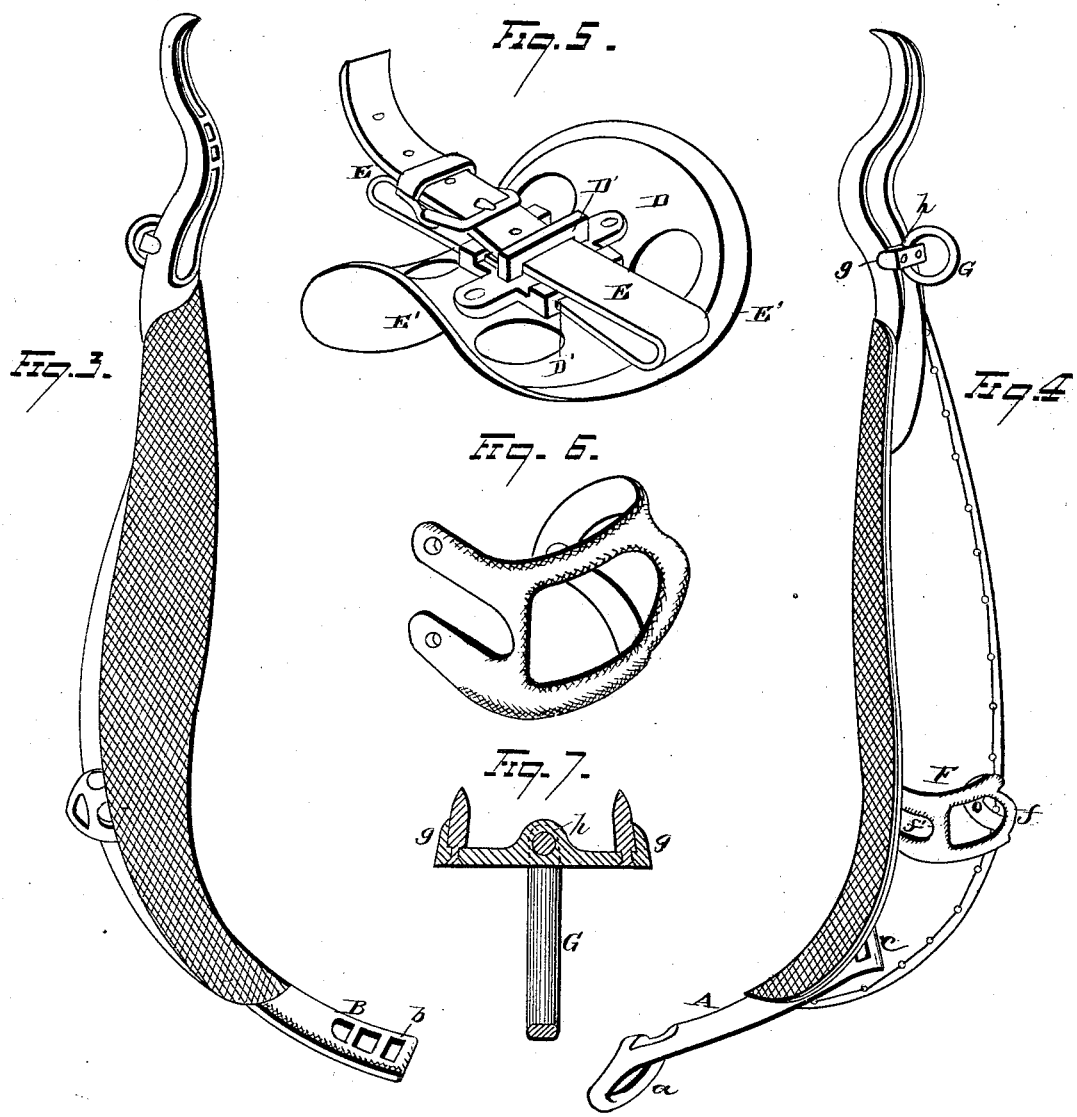

UNITED STATES PATENT OFFICE.

SAMUEL D. REYNOLDS, OF ROCHELLE, ILLINOIS.

IMPROVEMENT IN HORSE-COLLARS.

Specification forming part of Letters Patent No. 217,902, dated July 29, 1879; application filed June 10, 1879.

*To all whom it may concern:*

Be it known that I, SAMUEL D. REYNOLDS, of Rochelle, in the county of Ogle and State of Illinois, have invented certain new and useful Improvements in Horse-Collars; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

My invention is designed to provide certain improvements upon the horse-collar which constitutes the subject-matter of Reissue Letters Patent No. 8,746, granted to me June 10, 1879; the object being, first, to cause the lower ends of the collar to be united more perfectly by forming the same with improved metallic couplings, which prevent any undue tendency of the collar to roll upon the horse's shoulders; secondly, to provide an improved metallic neck-pad; thirdly, to provide an improved form of draft attachment, as the traces or tugs connect directly with said collar-sections; fourthly, to provide an improved attachment for the breast or the holdback straps, in substitution for the rings commonly used on hames for such purpose; and, fifthly, to provide improved means for directly connecting the rein-rings with said collar.

In the drawings, Figure 1 is a view, in elevation, of the breast or working side of a collar embodying my improvements. Fig. 2 is a view, in elevation, of the opposite or outer side. Fig. 3 is a view, in perspective, of the collar-section made with a metallic coupling-loop. Fig. 4 is a similar view of opposite section. Fig. 5 is a detail view of the top pad. Fig. 6 is a detail view of one of the attachments designed jointly for connecting the draft-irons and the breast or holdback straps thereto. Fig. 7 is a sectional view, representing the manner of attaching the rein-rings to the cross-bars which respectively secure them to the collar-sections.

The collar is made of metal and in two independent sections, said sections being longitudinally of concavo-convex form, so that broad curved bearings may be provided for the shoulders of the animal.

Inasmuch as the collar-sections are to be made in general construction similar to the metallic sections described in my previous patent referred to, it is unnecessary to describe herein the advantages of making them in form and material as I do.

The two couplings are made with their contact-surfaces the counterpart, so that they may fit together, coupling A being concave on its outer side and receiving the convex side of coupling B. Said coupling A is formed at its outer end with the loop *a*, through which passes coupling B, while the outer end of this latter coupling is formed with a metallic loop, *b*, which provides engagement for a strap, C. This strap engages with a similar metallic loop, *c*, formed on the opposite collar-section, and thereby said two sections may be fastened together by a strap, as is my preferable way, or by any other flexible connecting device. The overlapping and interlocking of the couplings, together with this flexible connection, permit their respective collar-sections to independently adjust themselves upon a horse's neck and shoulders, while they are prevented from all undue rolling or rocking movement thereon.

The metallic top pad, D, is formed independent of both collar-sections, so as to permit this ready and free adjustment of said sections, and also adjust itself to the neck of the animal without restraint on the part of the collar-sections. It is open-worked in greater or less degree, in order to render it light and easy in wear; also, to prevent the neck from undue perspiration in warm weather. It is provided with one or more metallic loops, D', formed in same piece with or independently secured on its upper surface, whereby a strap or an equivalent flexible fastening, E, connects said pad with the collar-sections. This top pad, as made of metal, constitutes in itself a complete pad, and, if desired, the same may be without any addition; but preferably I use the leather E', in order to protect the coating or paint from being worn off the metal, and thus exposing the latter to rust.

Each section is provided with an attachment, F, which consists of two outwardly-curved bars, which extend transversely over the longitudinal concavity of the collar-section, and are riveted to opposite sides thereof. An outer cross-bar, $f$, provides engagement for the tug or trace, which may connect with said collar-section, while an inner cross-bar, $f'$, provides engagement for the breast-strap, or for the holdback-strap, as the case may be. Preferably I make this attachment in a single metallic piece, as shown in the drawings.

Each rein-ring G passes through an eye formed in the cross-bar $g$, which extends transversely over the longitudinal concavity of the collar-section, to which said rein-ring is secured. Annular abutments $h$, formed on the ring, bear against opposite sides of said cross-bar and secure the same to the collar, so that the ring does not slide in its eye-bearing.

It is found that a collar made with the improvements herein described is serviceable, easy, and pleasant in wear, and is admirably adapted to effect the several purposes of my invention, as first stated.

Having fully described my invention, what I claim as new, and desire to secure by Letters Patent, is—

1. The combination, with a metallic coupling-section provided with a loop, of an overlapping metallic coupling-section which has free longitudinal movement within said loop, and a strap which connects the overlapping coupling-section with the opposite collar-section, substantially as set forth.

2. The combination, with a concavo-convex metallic coupling-section whose free end projects outwardly and is provided with an end loop, of an overlapping metallic coupling-section which passes through said loop and fits within said concavity, together with a strap which connects the free end of the overlapping coupling-section to the opposite collar-section, substantially as set forth.

3. The combination, with a collar-section and bars which extend over the concavity thereof, of a cross-piece secured to said bars, and adapted to provide engagement for a breast or holdback strap, substantially as set forth.

4. The combination, with a concavo-convex collar-section and bars which extend transversely over the same, of a cross-piece secured to said bars, and adapted for a draft device to engage therewith, substantially as set forth.

5. The combination, with a concavo-convex collar-section and outwardly-curved bars whose respective extremities are secured to opposite sides of said concavity, of a rear cross-piece for the draft device to engage with, and a front cross-piece for the breast or holdback strap to engage with, substantially as set forth.

6. An open-worked metallic neck-pad having its front and rear portions upturned and its central portion provided with one or more strap-loops, substantially as set forth.

7. In a metallic collar, the combination, with a bar which extends transversely over the longitudinal concavity in a collar-section, of a rein-ring which passes through an eye in said bar, and has abutments which bear against opposite sides of said bar, substantially as set forth.

In testimony that I claim the foregoing I have hereunto set my hand this 28th day of May, 1879.

SAMUEL D. REYNOLDS.

Witnesses:
  H. F. TALBOT,
  C. C. BENNETT.